No. 677,908. Patented July 9, 1901.
F. A. WEGNER.
COUPLING.
(Application filed Oct. 19, 1900.)
(No Model.)
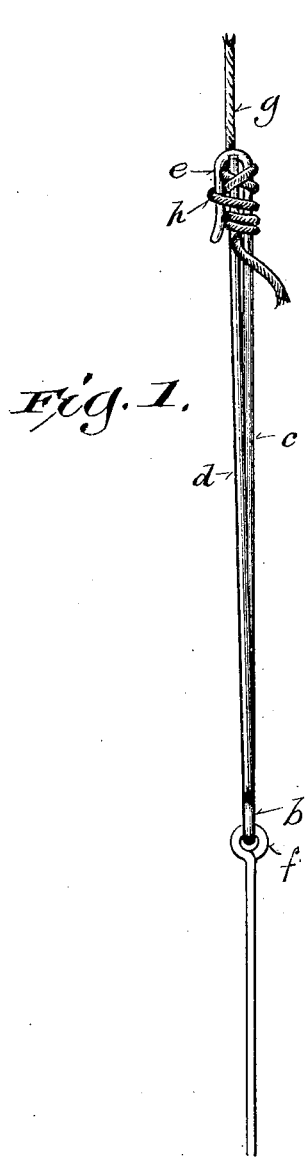
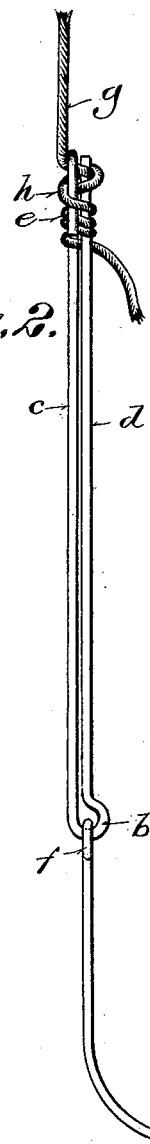
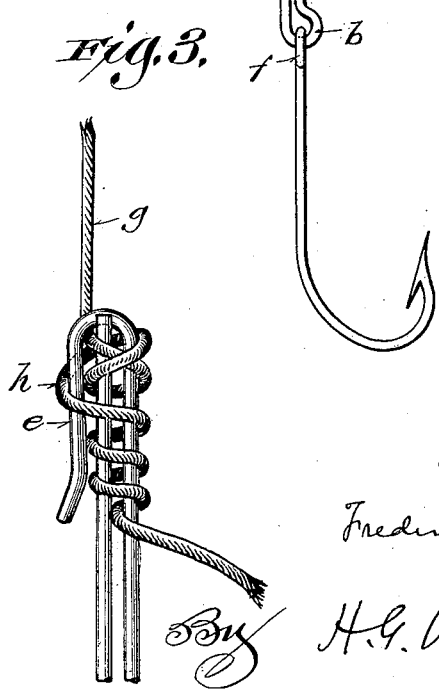
Witnesses:
Leo W. Young,
N. E. Oliphant
Inventor:
Frederick A. Wegner
By H. G. Underwood
Attorney

UNITED STATES PATENT OFFICE.

FREDERICK A. WEGNER, OF DETROIT, MICHIGAN.

COUPLING.

SPECIFICATION forming part of Letters Patent No. 677,908, dated July 9, 1901.

Application filed October 19, 1900. Serial No. 33,566. (No model.)

*To all whom it may concern:*

Be it known that I, FREDERICK A. WEGNER, a citizen of the United States, and a resident of Detroit, in the county of Wayne and State of Michigan, have invented certain new and useful Improvements in Couplings; and I do hereby declare that the following is a full, clear, and exact description thereof.

My invention has for its object to provide simple, economical, and convenient couplings especially designed for detachably connecting fish lines and hooks, but which are otherwise applicable, said invention being hereinafter particularly set forth with reference to the accompanying drawings and subsequently claimed.

Figure 1 of the drawings represents a front elevation of a coupling device in accordance with my invention connecting a fish line and hook; Fig. 2, a side elevation of the same, and Fig. 3 an enlarged front elevation of one end of said device with a line in connection therewith.

Referring by letter to the drawings, I show a single, preferably spring, wire bent to form an eye $b$ and have two straight stretches $c$ $d$ extend any preferred degree of distance from said eye, these stretches being of practically the same length. The terminal of stretch $c$ farthest from eye $b$ is recurved to form a hook $e$, that extends for the most part toward said eye, in the present showing standing at a right angle to the same, the other stretch $d$ being terminated against the bow of the hook. However, it is practical to have the hook and eye on the same plane. The shank-eye $f$ of a fishhook is shown caught in the eye $b$ of the coupling, and a fish-line $g$ is shown coiled and knotted on the hook end of said coupling. However, the manner of connecting the line and coupling may be varied from what is herein shown according to the convenience of the operator and disposition of the hook $d$ with respect to the plane of eye $b$ aforesaid.

The coiling and knotting illustrated are done as follows: An end of the line $g$ is caught between the stretches $c$ $d$ of the coupling, said line coiled around said stretches as many times as may be desirable, a loop $h$ caught over a finger or thumb of the operator, and the coiling continued indefinitely, after which the coils and loop are moved outward to have said coils come inside the coupling-hook and the loop outside of said hook, upon which it is drawn taut by a pull on the line. If desirable, a plurality of successive loops may be made to encircle the coupling-hook.

While I have particularly described the coupling as a device for detachably connecting a fish line and hook, it is applicable for connecting some other variety of line with a hook or eye, the gage of the wire from which said coupling is made being greater or less, as the utility of the aforesaid link may require.

Having thus described my invention, what I claim as new, and desire to secure by Letters Patent, is—

1. A coupling consisting of a single wire bent to form an eye and have two straight stretches extend from the eye, one stretch being recurved to form a hook that extends for the most part toward said eye and has its bow lapped by a terminal of the other stretch, the aforesaid eye being for engagement with a hook, eye or bend of some device other than the coupling, and the hook end of said coupling for connection with a line coiled and knotted thereon.

2. A coupling consisting of a single wire bent to form an eye and have two straight stretches extend from the eye, one stretch being recurved to form a hook that extends for the most part toward said eye at a right angle to the plane of same and has its bow lapped by a terminal of the other stretch, the aforesaid eye being for engagement with a hook, eye or bend of some device other than the coupling and the hook end of said coupling for connection with a line coiled and knotted thereon.

In testimony that I claim the foregoing I have hereunto set my hand, at Milwaukee, in the county of Milwaukee and State of Wisconsin, in the presence of two witnesses.

FREDERICK A. WEGNER.

Witnesses:
N. E. OLIPHANT,
B. C. ROLOFF.